June 21, 1966  F. B. BROCKHUES ETAL  3,257,103
APPARATUS FOR PROCESSING EXPANDABLE PLASTIC MATERIAL
Filed July 6, 1962  4 Sheets-Sheet 2
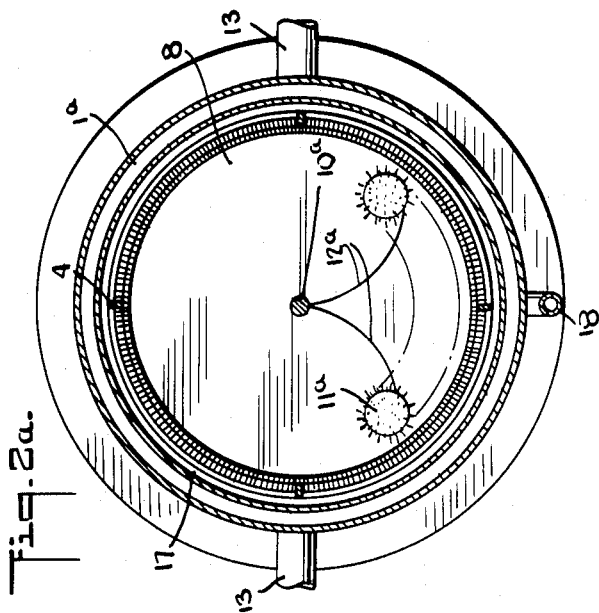
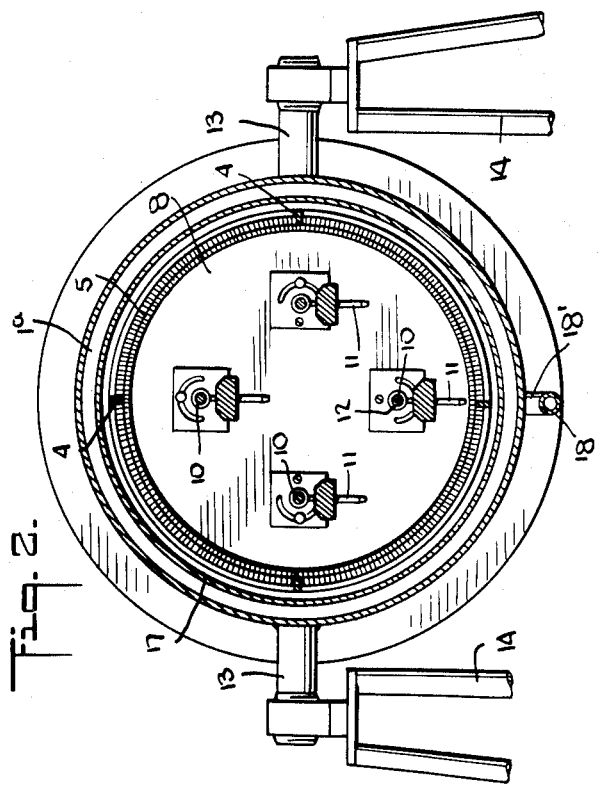
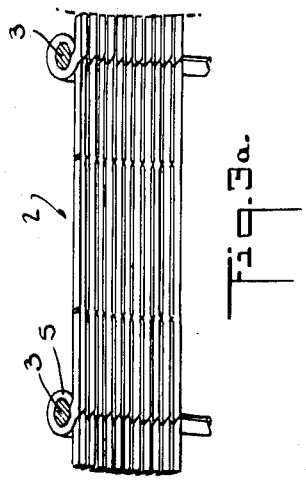
INVENTOR.
FREDERICK B. BROCKHUES
BY WILHELM MUHM
AGENT

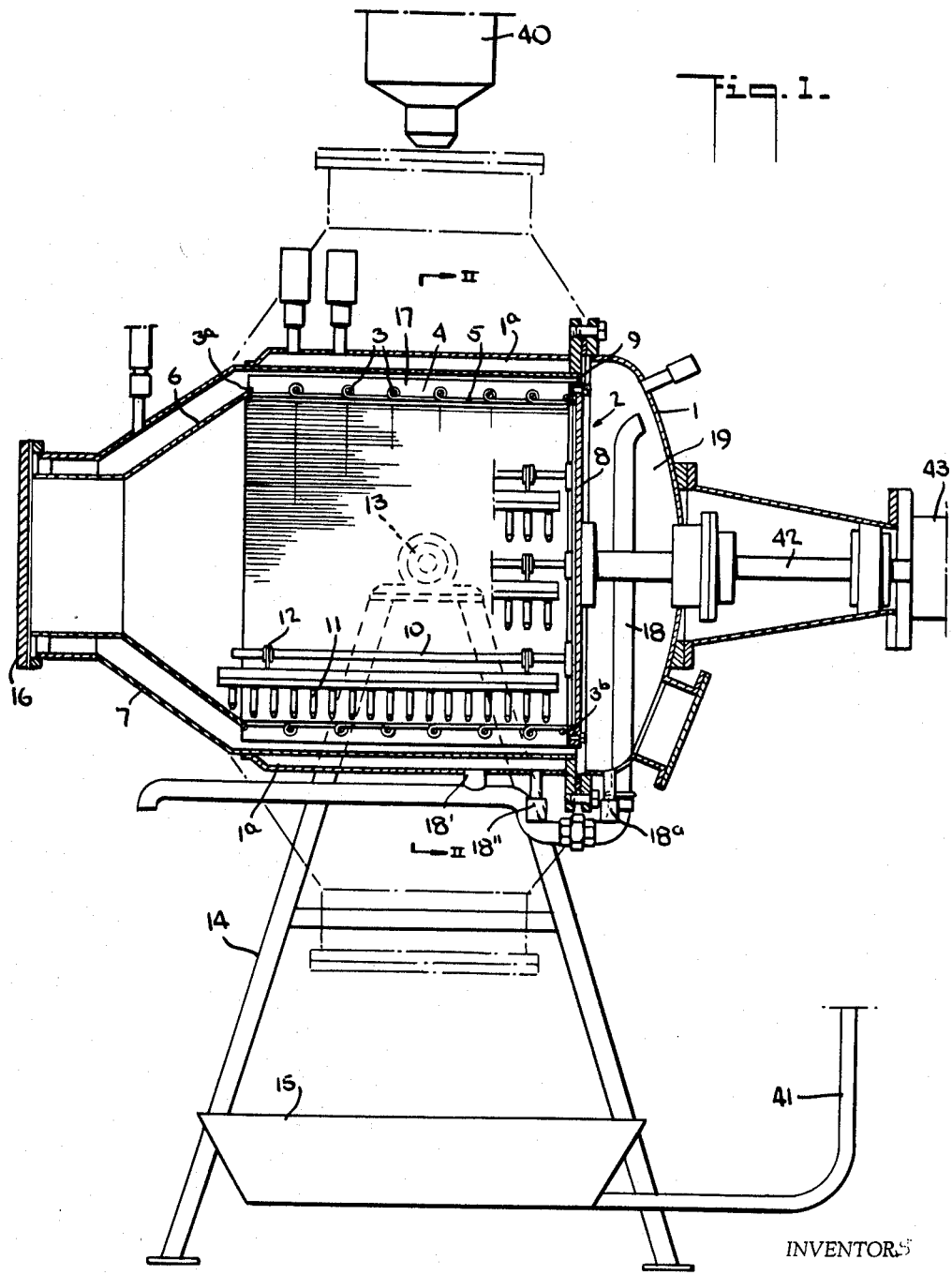

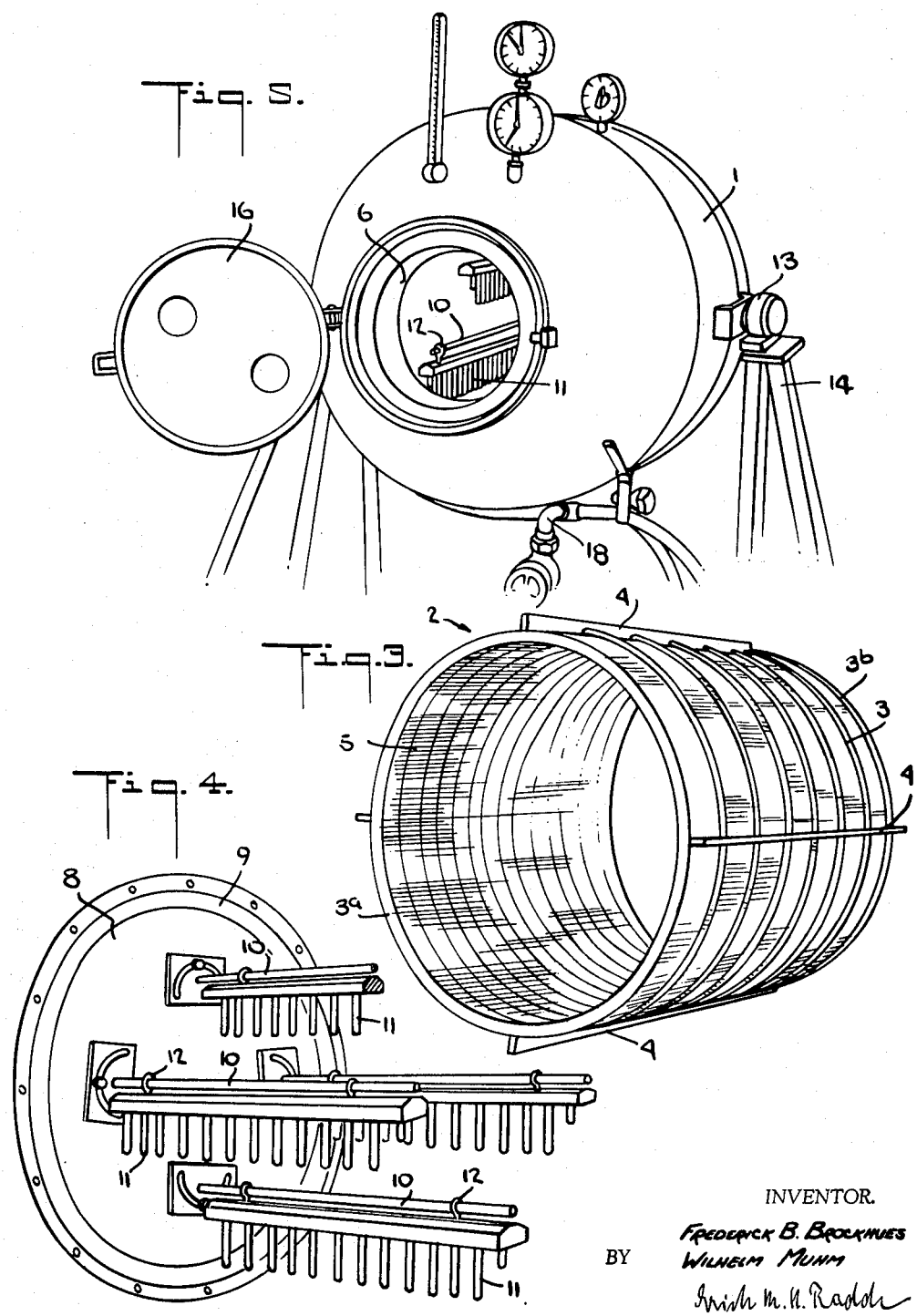

June 21, 1966   F. B. BROCKHUES ETAL   3,257,103
APPARATUS FOR PROCESSING EXPANDABLE PLASTIC MATERIAL
Filed July 6, 1962   4 Sheets-Sheet 4
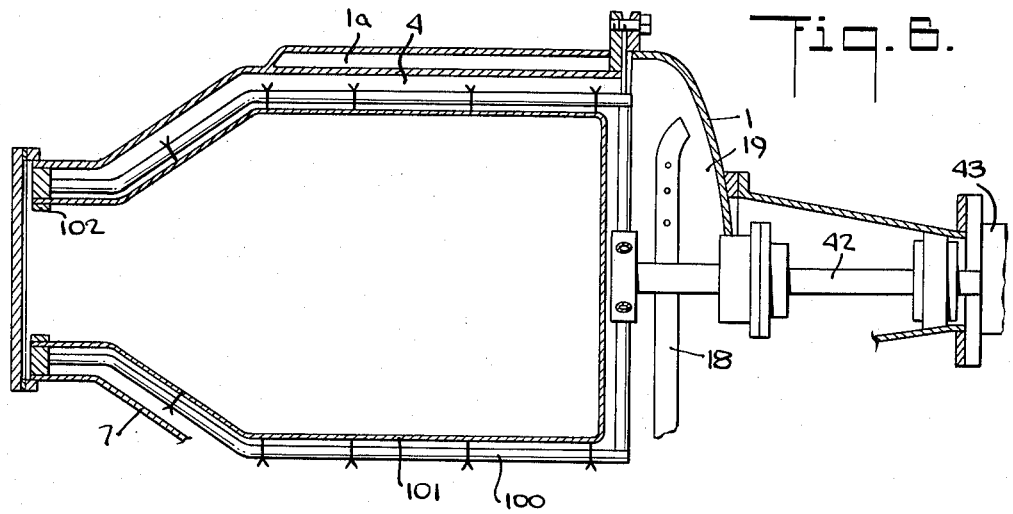
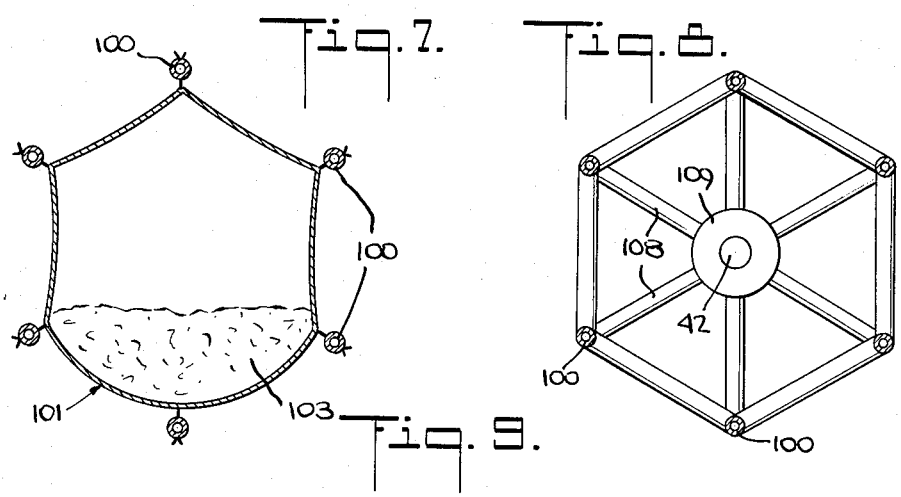
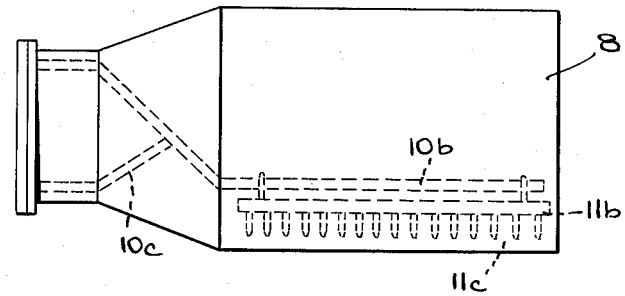
INVENTORS
FREDERICK B. BROCKHUES
WILHELM MUHM
BY
AGENT

3,257,103
APPARATUS FOR PROCESSING EXPANDABLE PLASTIC MATERIAL
Frederick B. Brockhues, 442 Haus, Vaduz, Liechtenstein, and Wilhelm Muhm, 29a Humboldtstrasse, Wiesbaden, Germany
Filed July 6, 1962, Ser. No. 207,875
10 Claims. (Cl. 263—21)

This application is a continuation-in-part of copending application Serial No. 667,434, filed June 24, 1957, now Patent No. 3,042,973, entitled, "Process of Manufacturing a Shaped Body of Porous Polystyrene Foam of Low Density."

The present invention relates to the manufacture of porous, shaped plastic bodies, preferably of polystyrene bodies of low density, and more particularly to apparatus for processing expandable, i.e., foamable plastic material and especially of foamable polystyrene.

Many difficulties have been encountered in the manufacture of compact shaped bodies from pre-expanded, still expandable (foamable) polystyrene in the pre-expanding of polystyrene as well as in the final molding of the pre-expanded resin.

In the processing of expandable polystyrene, which is polystyrene having an expanding agent incorporated therein, such as produced by Badische Anilin- & Soda-Fabrik of Ludwigshafen (Rhine), Germany and by its several U.S.-licensees, for instance, Koppers Company, Inc., and The Dow Chemical Company, it is commercially and technically important to be able to form shaped bodies not only from the raw material itself but also from pre-expanded beads. Using such pre-expanded beads has the advantage of shortening the final expanding time in the molds and of reducing the bulk density of the shaped body.

It is a more specific object of this invention to provide pre-expanding and molding apparatus which comprises a double-walled container adapted to be heated and insulated against heat dissipation. All the interior walls of the mold are perforated, steam-permeable and preferably at least two of the walls are made of slotted sieves.

A primary object of the present invention consists in providing an apparatus for pre-expanding or prefoaming expandable polystyrene beads which apparatus permits rapid heating of the expandable polystyrene beads to a predeteermined expanding temperature and the production of substantially dry pre-expanded beads having a bulk density of less than 1.5 lb./cu. ft., preferably less than ¾ lb./cu. ft., which do not adhere nor stick to each other and which can directly be used without drying for molding to form the desired highly porous, lightweight polystyrene bodies of fully expanded beads.

Other objects of the present invention and advantageous features thereof will become apparent as the description proceeds.

According to the present invention, polystyrene can be pre-expanded in such a manner that it is obtained not only in dry form but in particulate form by carrying out such pre-expansion in a rotating drum comprising specifically constructed sieves, said rotating drum being surrounded by a rigid container adapted to be heated and insulated against heat dissipation and having steam supply means arranged between the outer jacket and the sieve. The sieve may be a slotted sieve, a metal mesh, such as wire mesh, a stretched metal sieve, or a permeable textile web or fabric.

The above and other objects, features, and advantages of the present invention will be more fully explained in the following detailed description of certain preferred embodiments thereof, taken in conjunction with the accompanying schematic drawings. In said drawings:

FIG. 1 is a sectional side view of a pre-expanding drum according to the invention;

FIG. 2 is a sectional front view along line II—II of FIG. 1;

FIG. 2a is another sectional front view along line II—II of FIG. 1 but showing another embodiment of baffle or scraper elements;

FIG. 3 is a perspective view of the rotatable sieve drum holding the expandable polystyrene during pre-expanding;

FIG. 3a is an enlarged view of a portion of the sieve drum;

FIG. 4 is a perspective view of the back plate and scrapers or baffles shown in FIG. 2 and forming part of the drum assembly;

FIG. 5 is a perspective front view of the drum with its front door open;

FIG. 6 is a view of a pre-expander with a flexible inner container, similar to FIG. 1;

FIGS. 7 and 8 show the suspension of the flexible container of FIG. 6;

FIG. 9 shows the pre-expander drum of FIG. 1 with a preferred scraper arrangement.

As shown, the pre-expander of the invention comprises an outer insulating housing 1 with heating jacket 1a and an inner container constituted by drum 2 consisting of a cylindrical framework including circular rods 3 and longitudinal reinforcing strips 4, closely spaced wires 5 being coiled about the rods 3 to form a cylindrical sieve element. The outer supporting ring 3a of the cylindrical framework has secured thereto a frusto-conical funnel member 6 fitting into the corresponding part 7 of the insulating jacket. The back wall of the inner container is constituted by round metal plate 8 which is secured to outer supporting ring 3b of the framework. The plate is provided with a circular gasket of rubber or like material. The framework may be secured to member 6 and plate 8 by any suitable means, such as riveting, welding, bolting and the like.

As best shown in FIG. 4, supporting rods 10 are secured to the metal plate 8 to hold baffle rakes 11 which are freely mounted on the rods by means of eyelets 12. Thus, the rakes will execute a pendulum movement and always remain in a vertical position pointing downwardly during rotation of the drum. Preferably, the rakes are made of wood or a similar material which shows a minimum affinity to polystyrene and poor heat conductivity so that the beads will not stick to the baffles during rotation of the drum but will merely be moved very gently to prevent the beads from sticking together.

For the production of very light pre-expanded polystyrene beads having a bulk density of ½–¾ lb./cu. ft., for instance, it is particularly important to move the pre-expanded, warm and soft beads with utmost care and most gently in the pre-expander to avoid collapse of the pre-expanded beads, which would increase their bulk density. The pendulum rakes of the present invention assure such a gentle movement of the beads in the inner container during its rotation.

According to the preferred embodiment of FIG. 9 a single pendulum rake 11b is mounted in the inner container on rod 10b whereon the rake swings freely. The supporting rod 10b is fixed at one end to the outlet neck of the inner container and braced by rod 10c. The drum bottom 8 carriers a cam 11c for engagement with the pendulum member 11b so that the same is gently swung on its support once during each rotation of the drum.

In the embodiment of FIGS. 6 to 8, the inner container, which holds the polystyrene beads, consists of a permeable textile web, such as a fabric. The general structure of the pre-expander shown in FIG. 6 is the same as that of FIG. 1 so that the parts designated by the same reference numerals need not be described again. The inner container of this embodiment, however, is a bag 101, for instance, a burlap bag, which is suspended from six supporting tubes or rods 100 extending inside of, and along, the insulating jacket in hexagonal arrangement. The bottom of this inner container is constituted by six braces or spokes 108 connecting the respective supporting tubes 100 to the hub 109 connected to driveshaft 42. A clamping ring 102 holds the outlet end of bag 101 on the ends of tubes 100.

If the bag is loosely suspended on its six supporting tubes or rods, its horizontally extending bottom will sag under the load of a charge 103 of beads. This movement of the inner container walls during rotation of the container will suffice to impart a gentle movement to the beads so that no further means, such as the pendulum members shown in FIGS. 4 or 9, need be provided in this embodiment of the pre-expander.

FIG. 2a shows an alternative baffle or scraper means wherein a plurality of rubber balls 11a are attached to a center rod 10a by threads 12a. The hollow balls are made of steam-resistant rubber or the like and the length of the steam-resistant threads 12a is somewhat in excess of the radius of the drum so that the balls move freely in the drum during rotation and prevent the expandable polystyrene beads from sticking together during rotation of the drum. Preferably, the balls are provided with surface prongs or fingers.

The jacket 1 is mounted for pivotal movement on lugs 13 of supporting frame 14 so that the drum may be rotated upwardly into an upright position, in which it may be filled, and into a downward position, in which the pre-expanded polystyrene may be emptied into tray 15 (see dot-dash lines in FIG. 1). The jacket is pressure-tightly closed by door 16 hinged to front part 7 of the insulating jacket. In its upright position, the drum may be filled with expandable polystyrene beads from storage container 40. In its downward position, the drum empties the pre-expanded polystyrene into tray 15 whence it is pumped through pipe 41 to a storage means.

The inner container is mounted in the jacket for rotation therein on shaft 42 driven by electromotor 43 or other suitable driving means, an annular space 17 being provided between the jacket and the inner drum. Steam pipe 18 is mounted in the end chamber 19 of the housing with its steam supply opening directed towards the end wall of the housing. In this manner, condensate will leave chamber 19 by pipe 18a while relatively dry steam will enter the annular space 17 and will constantly be removed therefrom through an outlet pipe (not shown). In this manner, the atmosphere on the permeable inner container will be sufficiently moist to prevent hardening of the bead walls, which could prevent further preexpansion. On the other hand, the heated jacket surrounding the inner container prevents the formation of condensate in the flowing steam current, which would cause undue moistening of the beads. The steam pipe 18 also supplies steam to heating jacket 1a, pipe 18' connecting the steam pipe to the jacket and pipe 18" providing an outlet for the condensate from the jacket.

The pre-expanding apparatus operates as follows:

The drum is tilted on pivots 13 into its upright position, door 16 is opened and the inner drum 2 is filled with foamable or expandable polystyrene beads. The drum is then tilted back into the horizontal position shown in full lines in FIG. 1, the door 16 is locked, steam is supplied to pipe 18 and the inner drum 2 is rotated. The steam temperature is preferably about 110° C. and the steam treatment is continued for a few minutes. The polystyrene beads in the rotating drum are expanded under very gentle agitation during the steam treatment. The heating jacket 1a serves to heat the inner drum rapidly to the desired temperature and to avoid condensation of steam. This is important because the bulk density of the pre-expanded beads depends on the pre-expanding temperature and time. Thermostatic controls are, accordingly, provided, which regulate the temperature depending on the steam pressure, i.e., at increasing pressure or temperature, the steam valve is closed while it is opened as the temperature drops. Suitable time relay means control the treating time. Since the polystyrene beads are continuously but very gently moved about by the steam introduced under pressure through the meal mesh or sieve 5 or bag 101 as well as by the rotation of the inner container, they do not fuse together as in the case of steam pre-expanding in an autoclave. The constant movement does not permit any prolonged mutual contact of the beads, which effect is increased by the baffle rakes 11 or rubber balls 11a. Therefore, after pre-expanding is completed, the pre-expanded polystyrene beads can be poured out of the inner container by tilting it downwardly (see FIG. 1), the beads being substantially dry.

*Example*

4.000 kg. of expandable polystyrene resin known as "Styropor P" having an apparent density of 600 g. per liter, is pre-expanded in the inner drum 2 of the pre-expanding apparatus, said inner drum having a capacity of about 1000 liters. Steam of a temperature of 102° C. is introduced into said apparatus while rotating the drum. Expansion takes place and after about 3½ minutes the polystyrene is poured out of the drum. Its apparent density is 20 g. per liter. When heating the polystyrene to 105° C. for 2½ minutes, a pre-expanded material of an apparent density of 20 g. per liter is obtained, while when heating it to 110° C. for 2½ minutes the apparent density of the material is about 15 g. per liter. By varying the steam temperature and/or the steaming time, pre-expanded but still expandable polystyrene of any desired apparent density can be produced. Preliminary experiments permit to determine the most suitable steam temperature and steaming time required in each case. The resulting pre-expanded particles are pearl-shaped and are directly used for molding by complete expansion.

While the invention has been described in connection with certain new preferred embodiments, it will be understood that many modifications and variations may occur to the skilled in the art, particularly after benefitting from the present teaching, without departing from the spirit and scope of the present invention as defined in the appended claims.

We claim:

1. An apparatus for processing expandable beads of plastic material, comprising an inner container for beads, all of its walls being steam-permeable sieve elements having closely spaced continuous slots across the entire surface of said sieve elements, an exterior wall surrounding the inner container and defining a space therewith, an inlet for supplying steam under pressure to said space and through the steam permeable walls of the inner container into the interior of the container, and an outlet means permitting fluid to escape from said space.

2. The apparatus of claim 1, wherein said sieve elements are composed of a plurality of closely spaced profiled rods defining continuous parallel slots across the entire surface of said sieve elements.

3. The apparatus of claim 2, comprising a plurality of spaced posts for supporting the rods, the rods being looped about the posts and being perpendicular thereto.

4. An apparatus for processing expandable plastic beads, comprising an exterior wall and an inner container for said beads, container consisting of a frame mounted on the exterior wall, a plurality of spaced posts mounted in the frame, and a plurality of closely spaced profiled rods defining continuous parallel slots across the entire surface of the frame, said rods being looped about the posts and being perpendicular thereto, the exterior wall surrounding the container and defining a space therewith, an inlet for supplying steam under pressure to said space and through the slots formed by said parallel rods forming the inner container into the interior of the container, and an outlet means permitting fluid to escape from said space.

5. The apparatus of claim 4, wherein the rods have a thickness between about 2 mm. and about 4 mm. and the slots have a width between about 0.05 mm. and about 0.25 mm.

6. A pre-expander for particulate expandable plastic material comprising an outer insulating jacket, a rotatable inner drum spaced from the jacket, the drum wall consisting of a sieve element having closely spaced continuous slots across the entire surface, means for rotating the drum, the inner drum defining a pre-expanding chamber for the particulate plastic material, steam conduit means arranged to supply steam under pressure to the space between the insulating jacket and the inner drum, and steam outlet means permitting steam to escape from said space.

7. The pre-expander of claim 6, further comprising a pivot means mounting the outer jacket for pivotal movement in all directions about its longitudinal axis.

8. The pre-expander of claim 6, further comprising a freely movable baffle means mounted in the inner drum for gently moving the particulate plastic material in the drum during rotation thereof.

9. The pre-expander of claim 8, wherein the baffle means comprises a rake extending the length of the drum and means is provided for mounting the rake in the drum for pendulum movement about an axis parallel to the axis of the drum.

10. A pre-expander for particulate expandable plastic material, comprising an outer insulating jacket, a rotatable support frame within said jacket, means for rotating the support frame, a container of flexible, steam-permeable textile material supported on said frame and defining a pre-expanding chamber for the particulate plastic material, steam conduit means arranged to supply steam under pressure to the space between the insulating jacket and the inner container, and steam outlet means permitting steam to escape from said space.

References Cited by the Examiner

UNITED STATES PATENTS

| | | | |
|---|---|---|---|
| 447,673 | 3/1891 | Slottman | 165—86 |
| 1,411,591 | 4/1922 | Stevens | 23—290.5 |
| 2,445,919 | 7/1941 | Mitchell | 230—290.5 |
| 2,787,809 | 4/1957 | Stastny | 18—59 |
| 2,805,493 | 9/1957 | Besthorn | 34—130 |
| 2,948,926 | 8/1960 | Kuhn | 18—39 |
| 2,954,589 | 10/1960 | Brown | 264—51 |
| 3,022,058 | 2/1962 | Bixby et al. | 263—47 |
| 3,082,479 | 3/1963 | Chupa | 18—39 |

OTHER REFERENCES

"Dylite Expandable Polystyrene" published 1954 by Koppers Co., Pittsburg, Pa. Page 22 relied on.

"Molds and Fixtures for Styroper Fabrication," 1954, by Fritz Stastyn; p. 9 of translation.

WILLIAM F. O'DEA, *Primary Examiner.*

WILLIAM J. STEPHENSON, *Examiner.*

JOHN J. CAMBY, CHARLES SUKALO,
*Assistant Examiners.*